United States Patent [19]

Haferl

[11] Patent Number: 4,812,720

[45] Date of Patent: Mar. 14, 1989

[54] HIGH VOLTAGE STABILIZATION CIRCUIT FOR VIDEO DISPLAY APPARATUS

[75] Inventor: Peter E. Haferl, Adliswil, Switzerland

[73] Assignee: RCA Licensing Corporation, Princeton, N.J.

[21] Appl. No.: 202,359

[22] Filed: Jun. 6, 1988

[30] Foreign Application Priority Data

Oct. 23, 1987 [GB] United Kingdom ............. 8724891

[51] Int. Cl.⁴ .............................................. H01J 29/70
[52] U.S. Cl. .................................. 315/411; 358/190; 358/243
[58] Field of Search ................. 315/411; 358/190, 243

[56] References Cited

U.S. PATENT DOCUMENTS 4,227,125 10/1980 Bohringer .
4,232,254 11/1980 Haferl .
4,245,180 1/1981 Rilly et al. .
4,645,990 2/1987 Willis .

FOREIGN PATENT DOCUMENTS 2141883 1/1985 United Kingdom .

*Primary Examiner*—Theodore M. Blum
*Attorney, Agent, or Firm*—Paul J. Rasmussen; Joseph J. Laks; Sammy S. Henig

[57] ABSTRACT

A deflection circuit output stage generates in a deflection flyback resonant circuit a first flyback voltage at a horizontal frequency. A switch generates in a second flyback resonant circuit a second flyback voltage at the horizontal frequency having a phase relative to that of the first flyback voltage that is controllable. The first and second flyback voltages are summed and applied to a voltage tripler that produces an ultor voltage. A control circuit varies the phase of the second flyback voltage in a negative feedback manner that stabilizes the ultor voltage over a wide range of beam current variations.

17 Claims, 4 Drawing Sheets

HIGH VOLTAGE STABILIZATION CIRCUIT FOR VIDEO DISPLAY APPARATUS

This invention relates to a power supply for a television apparatus with high voltage stabilization.

In television receiver or monitor circuits, the ultor accelerating potential or high voltage for a picture tube is, typically, derived by rectifying a retrace pulse voltage developed in a high voltage winding horizontal output of a flyback transformer. The retrace pulse voltage is developed by a horizontal deflection circuit output stage that is coupled to the high voltage winding via the primary winding of the flyback transformer. The horizontal deflection circuit output stage comprises a horizontal deflection winding, a retrace capacitor and a trace switch, comprising a damper diode and a horizontal output transistor.

In typical television receiver circuits, raster size is inversely proportional to the square root of the ultor accelerating potential. Because the high voltage circuit exhibits a certain amount of source impedance, increasing the load current drawn from the ultor terminal will result in a decreased ultor accelerating potential. Ultor voltage variations resulting from variation of beam current occur mainly due to a leakage inductance between the high voltage and the primary winding of the flyback transformer. Ultor voltage variations lead to reduced performance. The reduced performance is manifested by undesirable raster size variations, reduced peak brightness and poor focus at high beam currents.

In one prior art arrangement, raster width variations are compensated by supplying an energizing voltage via a resistor across which a beam current dependent voltage drop develops. The resistor is coupled to the primary winding of the flyback transformer. Compensation is possible because the raster width variations are proportional to variations of the energizing voltage that is applied across the primary winding which determines the deflection current amplitude but are proportional only to the square root of the variations of the high voltage retrace pulse that is rectified. Disadvantageously, in such arrangements the voltage drop across the resistor further reduces the high voltage at high beam currents, resulting in a focus voltage and an ultor voltage that are not at optimal levels.

Because of the advent of, for example, very large picture tubes having increased resolution capability and the advent of high definition television, it may be desirable to have a better stabilized or regulated ultor voltage so as to obtain better display performance over the entire beam current or brightness range. It may be further desirable to have the ultor voltage adjustable to the maximum permissible value, taking into account the x-radiation limit, to obtain high brightness at low beam current and, therefore, a better spot size.

A high voltage power supply of a video apparatus, embodying an aspect of the invention, includes a source of an input signal at a frequency that is related to a deflection frequency and a first flyback resonant circuit. First switching arrangement responsive to the input signal and coupled to the first flyback resonant circuit generates a periodic, resonant first flyback voltage that is devloped across a high voltage winding of a flyback transformer. Second switching arrangement responsive to a control signal and coupled to a second flyback resonant circuit generates at a first terminal of the high voltage winding a periodic, resonant second flyback voltage at a controllable phase relative to the first flyback voltage that is applied in series with the first flyback voltage. A high voltage pulse, developed at a second terminal of the high voltage winding, has an amplitude that varies in accordance with the phase. A control circuit generates the control signal to vary the phase of the second flyback voltage relative to that of the first flyback voltage.

Figure 1:
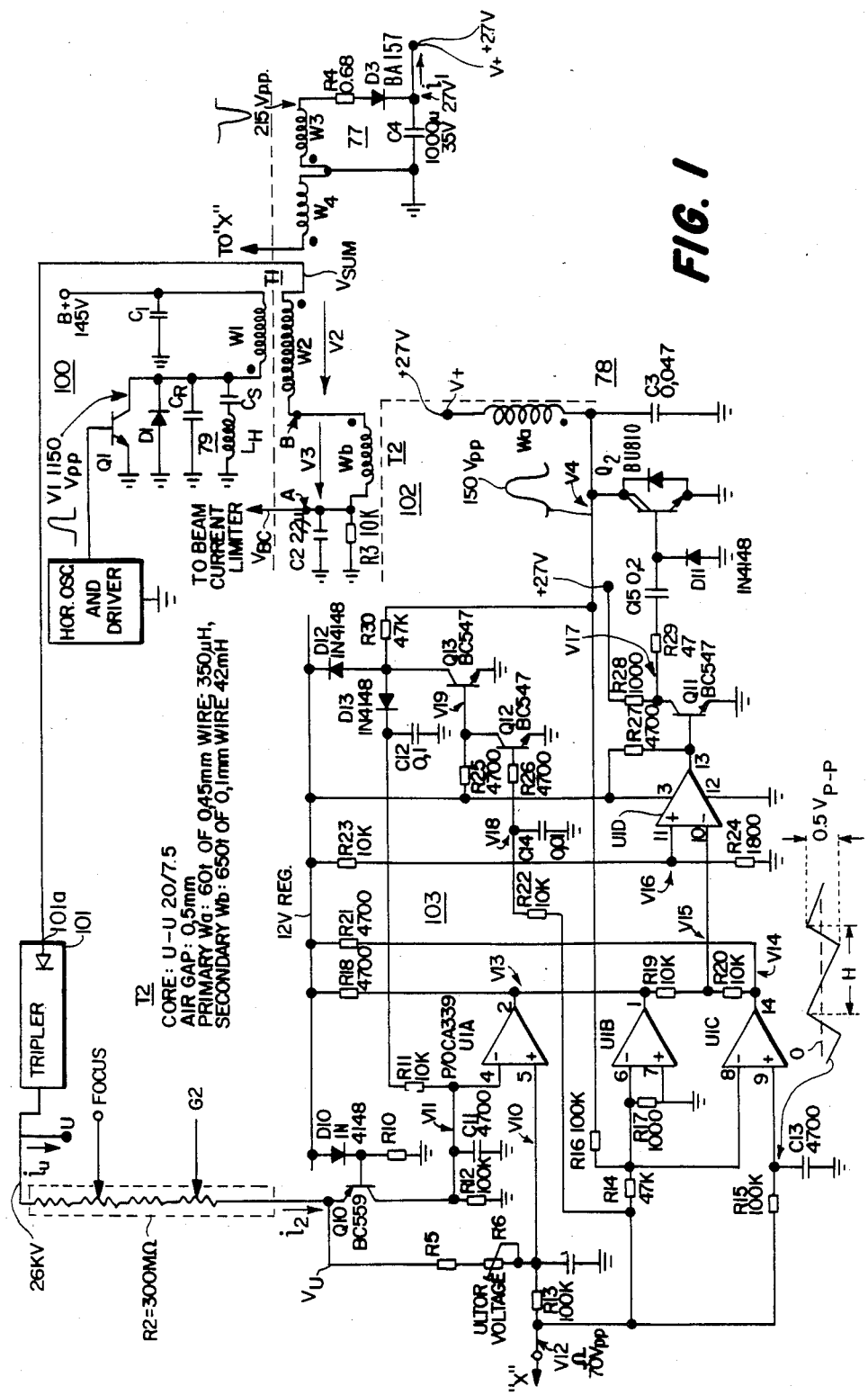
FIG. 1 illustrates a horizontal deflection circuit with ultor voltage stabilization, embodying an aspect of the invention.

FIG. 1 illustrates a horizontal deflection circuit 100 and a high voltage stabilization circuit 102 that generates a stabilized ultor voltage U, embodying an aspect of the invention. The circuits of FIG. 1 may be used in conjunction with, for example, a 110°, 27" 45AX color picture tube, not shown. For simplicity, east-west raster correction, horizontal linearity correction and component values, which are not relevant for explaining the invention, are omitted from FIG. 1.

High voltage stabilization circuit 102 includes a switching Darlington transistor Q2, a retrace capacitor C3 and a primary winding Wa of a transformer T2. Transformer T2 has a secondary winding Wb for developing a retrace or flyback voltage V3 between terminals A and B. Winding Wb is coupled at terminal B in series with a high voltage winding W2 of a flyback transformer T1.

A switching transistor Q1 of deflection circuit 100, responsive to a horizontal rate drive signal, generates a horizontal rate retrace voltage V1 in a deflection retrace or flyback resonant circuit 79 that is coupled via a primary winding W1 of transformer T1 to winding W2 to form a horizontal rate retrace or flyback high voltage V2 in winding W2. Winding W2 is coupled to a conventional voltage tripler 101 that generates an ultor voltage U in accordance with the sum of retrace voltages V2 and V3.

Circuit 102 is energized by a supply voltage V+, obtained, for example, from an arrangement 77. Arrangement 77 includes a winding W3 of transformer T1, a resistor R4 and a diode D3. Diode D3 conducts during trace. Voltage V+ may also be used, for example, to energize a vertical deflection circuit, not shown.

A beam current sampling resistor R3 and a capacitor C2 that are coupled in parallel are coupled between terminal A of winding Wb and ground. Consequently, a beam current dependent negative voltage $V_{BC}$ is developed across resistor R3 at terminal A which serves to lower the settings of brightness or contrast or both at excessive average beam currents. Voltage variations of voltage $V_{BC}$ at terminal A are, for example, between zero Volts and 15 Volts. Consequently, voltage $V_{BC}$ at terminal A has no appreciable influence on stabilization circuit 102 and, therefore, is not referred to in the description that follows.

Stabilization circuit 102 operates as an energy flywheel. When transistor Q2 is conductive, an increasing ramp current $i_1$ flows through winding Wa and stores energy in winding Wa. When transistor Q2 is switched off, the stored energy is transferred into retrace capacitor C3 and develops a retrace voltage V4 across capacitor C3 and across winding Wa that forms with capacitor C3 a retrace resonant circuit 78. Voltage V4 is transformer coupled to winding Wb and appears as voltage V3 across winding Wb that is in series with voltage V2.

A control circuit 103 of circuit 102 provides base drive that controls the turn-off timing of transistor Q2 at a horizontal frequency $f_H$ having a variable phase relative to that of the base drive of transistor Q1. The phase varies in accordance with a current $i_2$ that flows in a bleeder resistor R2 that is indicative of the level of ultor voltage U. Bleeder resistor R2 provides a focus voltage and a Grid 2 voltage to the picture tube, not shown. The peak voltage at an input terminal 101a of voltage tripler 101 that generates ultor voltage U is proportional to the peak value of the sum of retrace voltages V2 and V3. That peak voltage is controlled by control circuit 103.

In accordance with another aspect of the invention, ultor voltage U is held constant by a negative feedback loop of control circuit 103. Control circuit 103 varies the phase of voltage V4 and, hence, that of retrace voltage V3 with respect to horizontal retrace voltages V1, hence also with respect to retrace voltage V2.

FIGS. 2a-2f and 3a-3i illustrate waveforms useful for explaining the operation of the circuit of FIG. 1. Similar symbols and numerals in FIGS. 1, 2a-2f and 3a-3i indicate similar items or functions.

Figure 2:
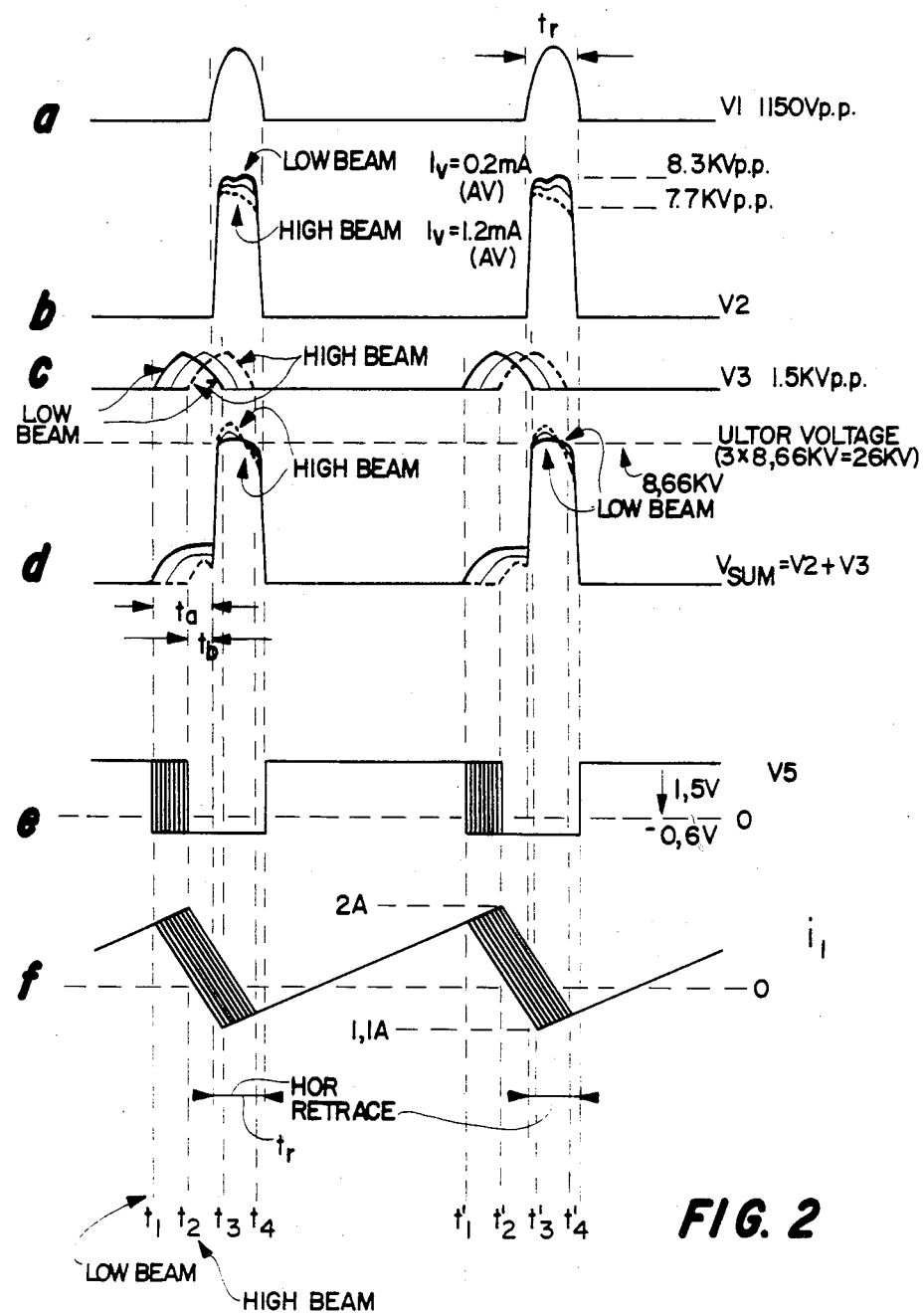
FIGS. 2a–2f and 3a–3i illustrate waveforms useful in explaining the operation of the circuit of FIG. 1.

FIG. 2c illustrates the phase relation of voltages V3 and V2 as a function of beam current. The phase of voltage V3 is advanced relative to that of voltage V2 by a time interval, depicted as ta, at low beam current. The low beam current is, illustratively, 0.2 ma, on the average. The phase advance, tb, of retrace voltage V3 is smaller at high beam current, that is, illustratively, 1.2 ma, on the average.

FIG. 2d illustrates a waveform representing the sum of the instantaneous values of retrace voltages V2 and V3. Voltage V3 adds only 0.36 KV to voltage V2 at low beam current to form a vol $V_{SUM}$ that is applied to terminal 101a of tripler 101. In comparison, the decreased phase advance at high beam current causes retrace voltage V3 to add more or 0.96 kV to voltage V2. The phase of voltage V3 of FIG. 2c is modulated in the range, $t_1-t_2$, that is illustratively, 8 microseconds.

In carrying out a feature of the invention, control circuit 103 shifts the phase of retrace voltage V3 of FIG. 2c in a way that causes current $i_2$ in resistor R2 of FIG. 1 to remain substantially constant when the beam current varies.

It should be understood that in another embodiment of the invention, not shown, a control circuit that is similar to control circuit 103 may be used to produce retrace voltage V3 with a phase lag, instead, relative to voltage V2.

In FIG. 2d the level of ultor voltage U is shown relative to the peak of the sum of voltages V2 and V3. The high beam envelope of the sum of voltage V2 and V3 of FIG. 2d is higher than ultor voltage U. The sum of the voltages is higher because of the voltage drop across the diodes, not shown, of tripler 101 of FIG. 1, causing an averaging effect of the peak voltage during retrace. The peak forward current $i_1$ of FIG. 2f that is coupled to winding Wa of FIG. 1 is higher at high beam currents because more energy is necessary to obtain ultor voltage U regulated.

Energy is always circulating in circuit 102. Therefore, when the displayed raster suddenly changes from dark to peak white, the already circulating energy is advantageously, rapidly transferred to winding Wb by immediately retarding the turn-off instant of transistor Q2. Likewise, the energy flow may be interrupted very fast by the capability of immediately advancing the turnoff instant of transistor Q2. This feature significantly improves the white window or white bar response of the display, not shown in the FIGURES.

The ratio between a variation of ultor voltage U to the corresponding beam current variation is conventionally referred to as the high voltage output impedance. To measure the output impedance, the beam current is changed, for example, from 0.2 mA to 1.2 mA. The measured drop in ultor voltage U is then divided by the beam current difference that is 1 mA, in the example.

In a conventional deflection circuit, using the same flyback transformer T1, that does not include an arrangement such as circuit 102, a drop of 2 kV was measured, corresponding to an output impedance of 2 megohms. In comparison, in the circuit of FIG. 1, using the same flyback transformer T1, the variation of ultor voltage U was, advantageously, reduced to 200 Volts, corresponding to an output impedance of 0.2 megohms. Advantageously, this lower source impedance resulted in a visible improvement of the displayed raster. In particular, the improvement occurs in focus, spot size and resolution capability at high beam currents.

Circuit 102 of FIG. 1 may also be adapted to operate with a flyback transformer utilized in an arrangement of the diode split type. In such case, a voltage analogous to voltage V2 may have to be three times higher and a corresponding flyback transformer may then require a winding with three times more turns to obtain the required peak voltage.

Figure 3:
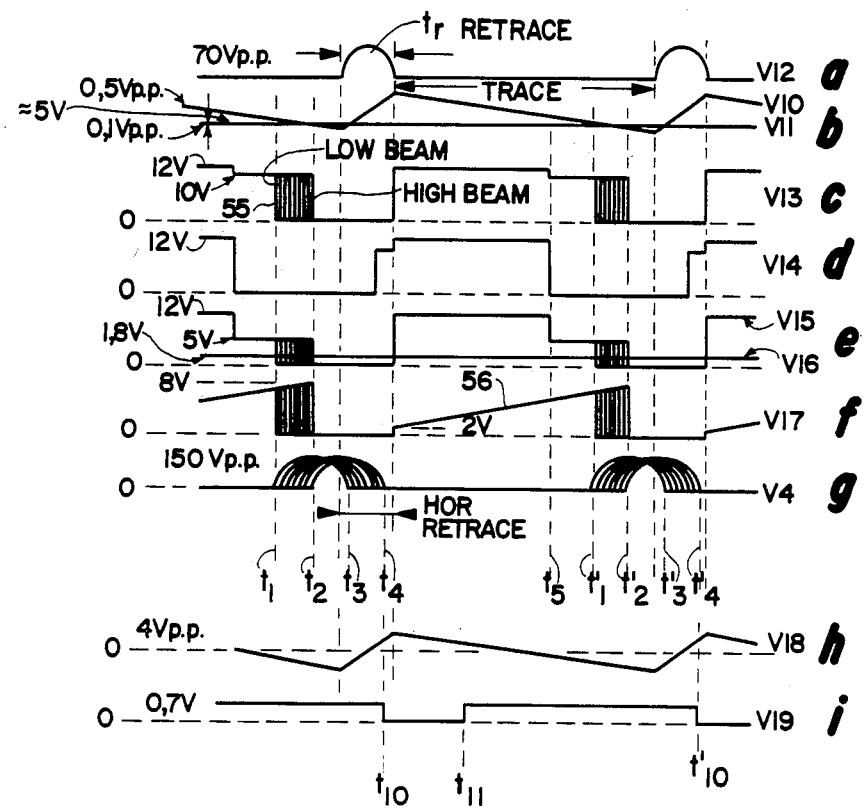

A retrace interval of voltage V4, for example, between time $t_1$ and $t_3$ of FIG. 3g is designed to be longer than that of a deflection retrace interval $t_r$ of voltage V1 of FIG. 2a or of voltage V12 of FIG. 3a. For example, the deflection retrace time $t_r$ may be 11.6 microseconds, corresponding to retrace resonance frequency of 44 kHz. In contrast, the retrace time $t_1-t_3$ of voltage V4 of FIG. 3g may be 16 microseconds, corresponding to retrace resonance frequency of 31 kHz. This provides a lower source output impedance across winding Wb of FIG. 1 that supplies voltage V3; hence, the regulation characteristic is smoother or more gradual because the rate of change of voltage V3 is lower than that of voltage V2.

In control circuit 103, bleeder resistor R2 is coupled to the emitter of a transistor Q10 that is coupled as a common base amplifier. The base of transistor Q10 is biases with a DC voltage of approximately +12 volts that is coupled via a diode D10. Diode D10 provides temperature compensation to the emitter-base junction voltage variations of transistor Q10.

Current $i_2$ in resistor R2, which is proportional to ultor voltage U, is separated into a first portion that is substantially unaffected by variations of ultor voltage U. The first portion flows through resistors R5, R6, and R13 and, via a winding W4, to ground. A second portion of current $i_2$ that varies when ultor voltage U varies, flows through transistor Q10 and produces, at an inverting input terminal of a comparator U1A and across a resistor R12, a voltage V11.

Advantageously, by biasing the base of transistor Q10 with approximately +12 volts, the portion of current $i_2$ that flows through resistor R12 that does not vary with variation of voltage U may be reduced without reducing the error voltage amplitude. Thus, resistor R12 can be high in value to obtain high amplitude error voltage with low average DC value. Low average DC value is desirable for operating within the input voltage range of comparator U1A.

Adjustment of resistor R6 that controls voltage U changes voltages V10 and V11 at the respective input terminals of comparator U1A in an opposite or differential manner. The more current is flowing through resistors R5, R6, and R13, the less current flows through resistor R12, and vice versa. The two current paths of current $i_2$ form an impedance coupled in series with bleeder resistor R2. Resistor R6 is adjusted to obtain the required DC levels of voltages V10 and V11 of FIG. 3b.

Unmodulated retrace voltage V12 of FIG. 1, developed across winding W4 of transformer T1, produces a horizontal sawtooth voltage component of voltage V10 across a capacitor C10 with a constant amplitude that is coupled to the noninverting input terminal of comparator U1A. Comparator U1A causes a falling edge 55 of FIG. 3c of a modulated voltage V13 of FIG. 1 to occur. Edge 55 of FIG. 3c that occurs at a crossover of voltages V11 and V10 determines the turn-off instant of transistor Q2 of FIG. 1 that may vary within the range $t_1$–$t_2$ of FIG. 3c. The time or phase modulation of edge 55 of voltage V13 is determined according to error voltage V11 of FIG. 3b which varies in a voltage range of approximately 100 millivolts over the variation range of ultor voltage U and of the beam current.

A comparator U1B of FIG. 1 that is responsive to unmodulated voltage V12 maintains voltage V13 at zero volts until just after time $t_4$ at the end of the horizontal retrace of FIG. 3c. Comparator U1B of FIG. 1 is also controlled by retrace voltage V4 that is coupled via a resistor R16. Comparator U1B prevents transistor Q2 from being turned on prior to the trailing edge of retrace voltage V4 of FIG. 3g.

A comparator U1C of FIG. 1 is controlled by a horizontal sawtooth waveform that is developed across a capacitor C13. Consequently, a voltage V14 of FIG. 3d that is produced by comparator U1C of FIG. 1 and that is summed with voltage V13 to form a voltage V15. Voltage V15 limits the modulation range to prevent it from occurring earlier than time $t_5$ of FIGS. 3c, 3d and 3e. Voltage V15 is compared with a constant DC threshold determining voltage V16 in a comparator U1D. Comparator U1D controls the operation of a driver transistor Q11.

Beam current variations cause ultor voltage U to vary that, in turn, causes collector current in transistor Q10 also to vary, accordingly. The result is a time modulation of edge 55 of voltage V13 of FIG. 3c. Consequently, the turn-on time of transistor Q11 of FIG. 1 is also phase modulated. When transistor Q11 is turned on, a phase modulated voltage V17 at the collector of transistor Q11 becomes zero at a controllable phase that occurs in the range $t_1$–$t_2$ of FIG. 3f. The turn-on instant of transistor Q11 of FIG. 1 causes the turn-off of transistor Q2.

In accordance with a further aspect of the invention, the turn-off instant of transistor Q2 controls the timing or phase of retrace resonant voltage V3 of FIG. 2c relative to that of retrace resonant voltage V2 of FIG. 2b. A change in beam current causes the sum of retrace voltages V2 and V3 of FIG. 2d to vary as a result of the phase change in a negative feedback manner that stabilizes ultor voltage U.

Voltage V17 of FIG. 3f at the collector of driver transistor Q11 of FIG. 1 has an upramping portion 56 of FIG. 3f caused by a capacitor C15 of FIG. 1 which is charged during the conduction time of transistor Q2. Capacitor C2 is discharged during the cut-off interval of transistor Q2 via a diode D11 and via transistor Q11.

Assume, hypothetically, an extremely high beam current load which then, delays or shifts to the right of FIG. 3g the trailing edge of retrace voltage V4 so as to overlap with the trace period OF VOLTAGE V12 of FIG. 3a. In such a case, the peak of voltage V4 of FIG. 3g may occur nearly coincidentally with the peak of voltage V12 of FIG. 3a or of voltage V2 of FIG. 2b. Consequently, control circuit 103 of FIG. 1, operating normally as a negative feedback loop, might, under such extremely high beam load current, function as a positive feedback loop that might cause it to latch up. To prevent this latch up, a transistor Q13 is switched to cut-off by the turn-on of a transistor Q12 during interval $t_{10}$–$t_{11}$ of FIG. 3i.

A horizontal sawtooth voltage V of FIG. 3h that controls the turn-on time of transistor Q12 is produced by a delay network that includes a resistor R22 and a capacitor C14 of FIG. 1 that is responsive to voltage V12. Interval $t_{10}$–$t_{11}$ is determined by the timing of the portion of voltage $V_{18}$ that is more positive than the forward voltage of the base-emitter junction of transistor Q12.

If the trailing edge of voltage V4 happens to appear during interval $t_{10}$–$t_{11}$, transistor Q13 will be in cutoff and will enable voltage V4 to charge a capacitor C12 via a resistor R30 that is coupled to the collector of transistor Q2 and via a diode D13. Therefore, the voltage in capacitor C12 that is coupled to comparator U1A via a resistor R11 will cause an increase in error voltage V11 and, in turn, an advance or a pull back to the left of retrace voltage V4 of FIG. 3g. In this way, the aforementioned latch-up condition is prevented from occurring. Thus, transistors Q12 and Q13 operate as a modulation range limiter.

Figure 4:
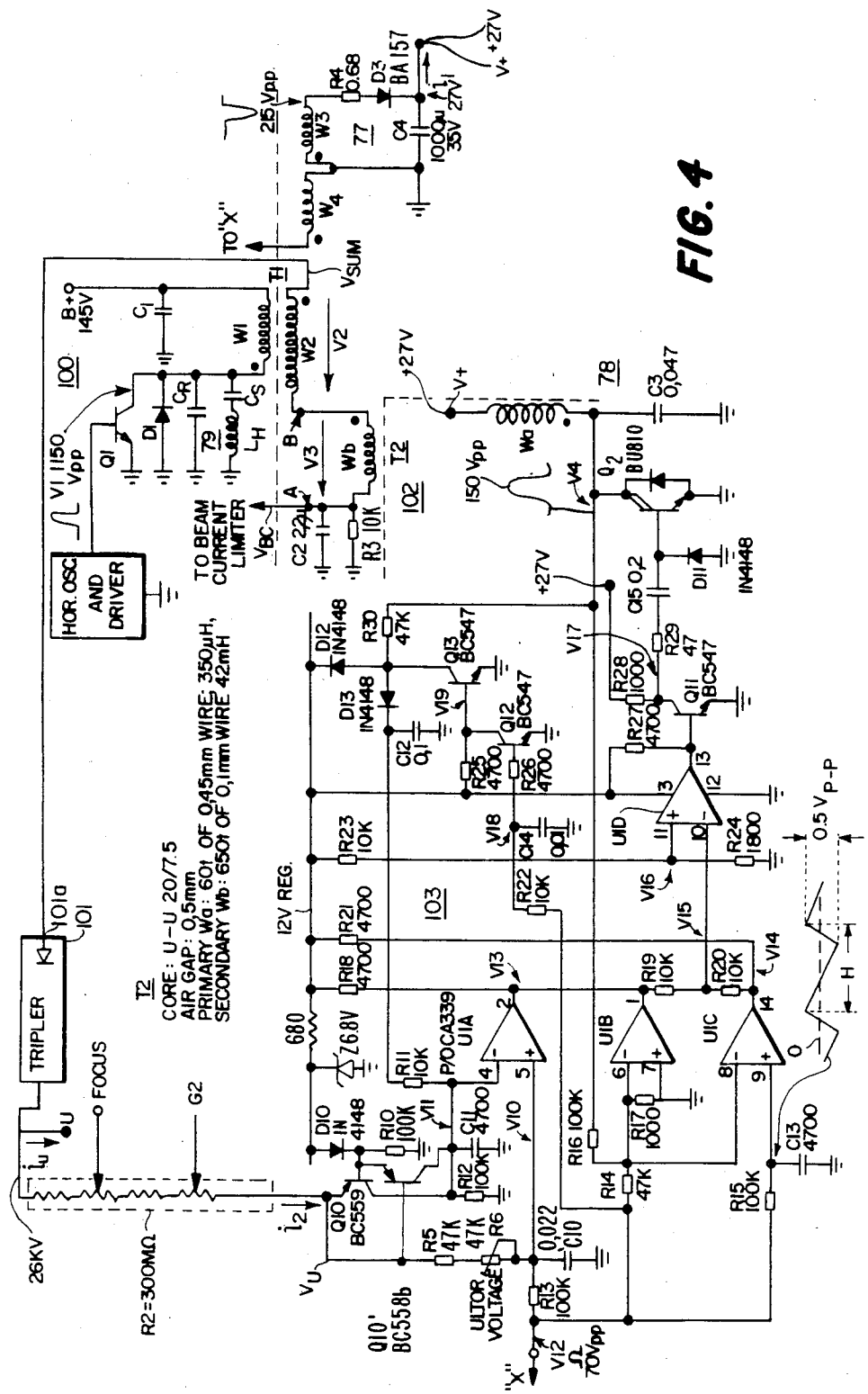
FIG. 4 illustrates a second embodiment of the invention that includes a protection circuit.

FIG. 4 illustrates a second embodiment of the invention. Similar numeral and symbols in FIGS. 1 and 4 illustrate similar items or functions. In FIG. 4 diode D10 is coupled to a zener diode that develops a 6.8 volt voltage at the anode of diode D10. A transistor Q10′ has an emitter electrode that is coupled to the base of transistor Q10. The base of transistor Q10′ is coupled to the emitter of transistor Q10. The collector of transistor Q10′ is coupled to the collector of transistor Q10.

Protection against defective or disconnected bleeder resistor R2 is provided by transistor Q10′ which is in cutoff during normal operation. When the current flowing through bleeder resistor R2 falls below ⅔ of its nominal value, transistor Q10 turns off and transistor Q10′ is turned on. The current flowing through transistor Q10′ charges capacitor C11, causing a fast increase of error voltage V11. This shifts the leading edge of voltage $V_4$ to a time that is analogous to time $t_5$ of FIG. 3g that is outside the control range.

What is claimed is:

1. A high voltage power supply of a video apparatus, comprising:
   a source of an input signal at a frequency that is related to a deflection frequency;
   a first flyback resonant circuit;
   first switching means responsive to said input signal and coupled to said first flyback resonant circuit for generating a periodic, resonant first flyback voltage that is developed across a high voltage winding of a flyback transformer;

a second flyback resonant circuit;

second switching means responsive to a control signal and coupled to said second flyback resonant circuit for generating at a first terminal of said high voltage winding a periodic, resonant second flyback voltage at a controllable phase relative to said first flyback voltage that is applied in series with said first flyback voltage such that a high voltage pulse is developed at a second terminal of said high voltage winding having an amplitude that varies in accordance with said phase; and a control circuit for generating said control signal to vary the phase of said second flyback voltage relative to that of said first flyback voltage.

2. A high voltage power supply according to claim 1 further comprising, rectifier means having an input terminal that is coupled to said high voltage pulse for generating a rectified high voltage that is coupled to a load circuit wherein said control circuit is responsive to said rectified high voltage for varying said phase of said second flyback voltage in a negative feedback manner that stabilizes said rectified high voltage when a current that flows in said rectifier means varies.

3. A high voltage power supply according to claim 1 wherein said first flyback resonant circuit comprises a horizontal deflection winding and a flyback capacitance 4. A high voltage power supply according to claim 3 wherein said flyback transformer comprises a primary winding that is coupled to said first flyback resonant circuit and wherein said high voltage winding comprises a tertiary winding of said flyback transformer.

5. A power supply according to claim 1 wherein said flyback resonance frequency of said second flyback resonant circuit is lower than that of said first flyback resonant circuit 6. A power supply according to claim 1 wherein said control circuit comprises means responsive to said input signal for generating a sawtooth signal having a constant phase relative to said input signal and means responsive to said sawtooth signal and to said high voltage pulse for generating said control signal having a corresponding controllable phase that varies in accordance with said high voltage pulse.

7. A power supply according to claim 1 wherein said first and second flyback voltages are at least partially overlapping.

8. A power supply according to claim 1 wherein said first flyback resonant circuit comprises a deflection winding and wherein said control signal has a corresponding controllable phase that causes said phase of said second flyback voltage to lead that of said first flyback voltage over an entire regulation range of said power supply.

9. A power supply according to claim 1 wherein said control circuit includes means responsive to said input signal for generating a sawtooth signal having a ramping portion and means responsive to said ramping portion and to said high voltage pulse to form a first transition edge of said control signal when a crossover of said ramping portion and of a signal that is representative of a level of said high voltage pulse occurs that controls the relative phase between said first and second flyback voltages.

10. A power supply according to claim 9 wherein said second switching means comprises a transistor switch having a control electrode that is coupled to said control signal and a main current conducting electrode that is coupled to said second flyback resonant circuit and wherein said transition edge causes said transistor switch to become nonconductive that causes a flyback interval to occur in said second flyback voltage.

11. A power supply according to claim 9 wherein said control circuit further includes means coupled to said first resonant circuit for generating a signal that is time shifted relative to said first flyback voltage and means responsive to said time shifted signal and to said second flyback voltage for generating a third signal when at least a portion of said second flyback voltage occurs during the occurrence of said time shifted signal, said third signal being coupled to said first transition edge generating means for varying the timing of said first transition edge to prevent said control circuit from operating in a positive feedback mode.

12. A power supply according to claim 1 wherein said first and second flyback voltages are produced in windings that are magnetically separated to produce said high voltage pulse in accordance with a sum of said first and second flyback voltages.

13. A power supply according to claim 1 wherein said high voltage winding of said first flyback transformer that is magnetically coupled to said first flyback circuit, wherein a winding of a second flyback transformer that is magnetically coupled to said second flyback resonant circuit and wherein said windings of said first and second flyback transformers are coupled in series to produce at a terminal of one of said windings that is coupled to an input terminal of a high voltage rectifier for generating a rectified high voltage at an output terminal of said rectifier.

14. A power supply according to claim 13 wherein said first flyback resonant circuit comprises a deflection winding, wherein a second winding of said first flyback transformer is coupled to a second rectifier that generates an energizing voltage and wherein said energizing voltage is coupled via a winding of said second flyback transformer to a main current conducting electrode of a switching transistor that is included in said second switching means.

15. A power supply according to claim 1 wherein said control signal generating means comprises, means responsive to said second flyback voltage and to said input signal for generating a signal that limits the range of said controllable phase to prevent said negative feedback from changing to being a positive feedback.

16. A power supply according to claim 1 further comprising, a rectifier coupled to said high voltage pulse for generating a rectified high voltage and third means having a first terminal that is coupled to said rectified high voltage through an impedance such that a current that flows via said impedance in said first terminal is indicative of said rectified high voltage for generating at a second terminal of said third means a signal that is indicative of said rectified high voltage having an average value that is level shifted by said third means relative to a voltage that is developed at said first terminal of said third means.

17. A power supply according to claim 15 wherein said third means comprises a transistor having an emitter electrode that is coupled through a bleeder resistance to said rectified high voltage and having a base electrode at a constant level for maintaining substantially constant a voltage that is developed at said emitter electrode thereof when said rectified high voltage changes and wherein said level shifted signal is generated at a collector electrode thereof.

* * * * *